Nov. 12, 1935.    H. DALLMANN    2,020,997
DEMAND INDICATOR
Filed March 23, 1935
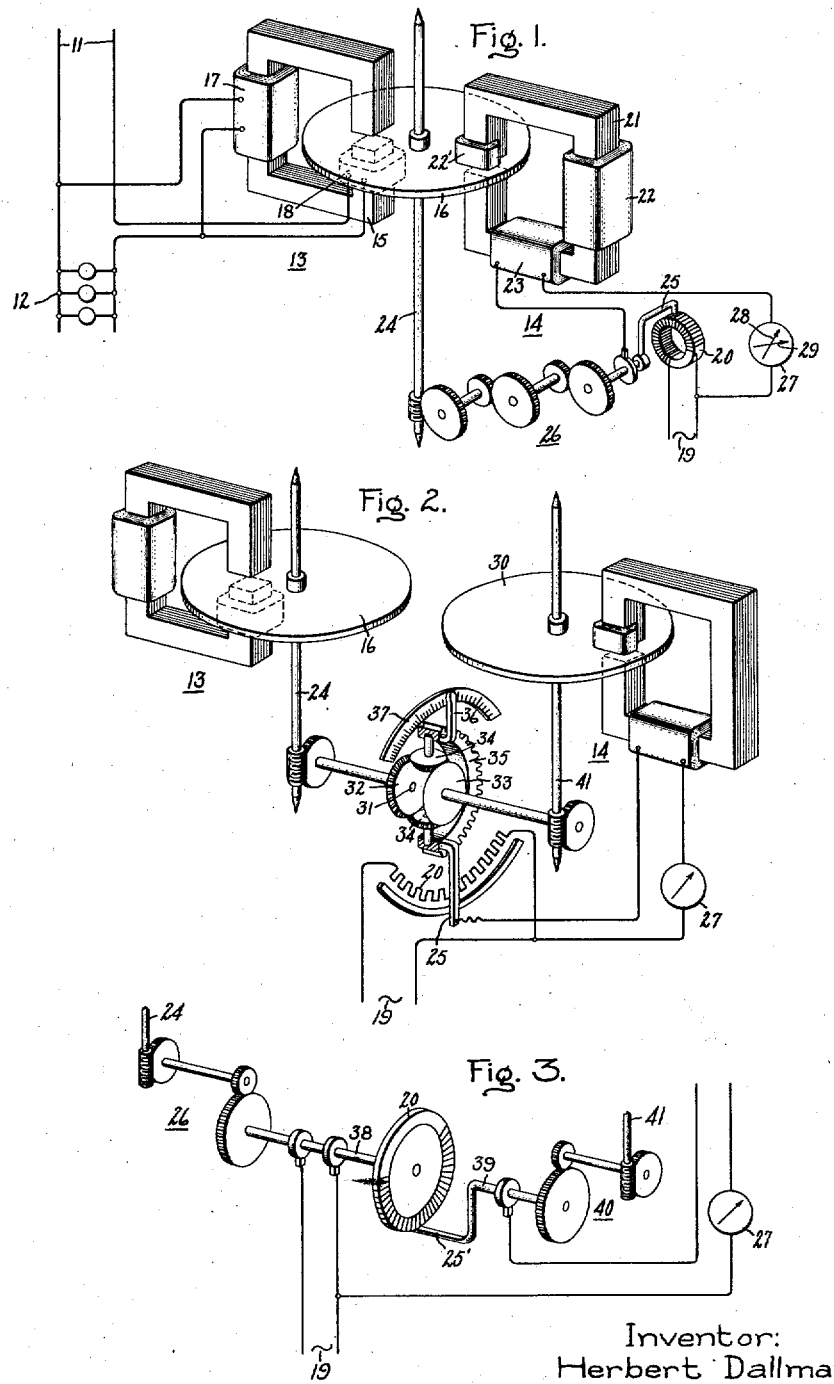
Inventor:
Herbert Dallmann
by Harry E. Dunham
His Attorney.

Patented Nov. 12, 1935

2,020,997

UNITED STATES PATENT OFFICE 2,020,997

DEMAND INDICATOR

Herbert Dallmann, Berlin-Karlshorst, Germany, assignor to General Electric Company, a corporation of New York Application March 23, 1935, Serial No. 12,611
In Germany June 27, 1934

12 Claims. (Cl. 171—34)

My invention relates to demand indicators and to methods and apparatus for measuring and recording mean values of variable quantities, particularly loads on electrical systems.

The principal object of my invention is to provide a simple, rugged arrangement for indicating at any instant the mean value of a variable quantity for the immediately preceding time period. It is an object to provide such an arrangement wherein the indication represents a weighted mean or what may be referred to as a logarithmic mean in which peaks of short duration receive relatively more weight than sustained peaks, and receive progressively less weight the longer they are sustained.

It is a further object of my invention to provide a demand indicator in which thermal elements, friction drives, and resetting mechanisms are eliminated, in which possibility of slippage is overcome, and in which smooth and continuous operation is obtained.

Another object is to provide a demand indicator of the logarithmic-law type in which discrepancies from logarithmic response are eliminated.

Other and further objects and advantages will become apparent as the description proceeds.

In determining rates for the supply of electrical energy by central stations, it is frequently desirable to determine a customer's maximum demand or to obtain a record of his demand at various times, since the investment required by a central station is determined by the maximum load or demand for power rather than by the average throughout the month or year. Instantaneous peak loads in excess of the rated load of the apparatus of the central station may, however, be borne by the apparatus if such peaks are of sufficiently short duration. Accordingly, demand indicators are used which respond to the blocks of energy supplied within short intervals of time of the order of fifteen or thirty minutes rather than to the instantaneous power in kilowatts. Demand indicators are known of both the block interval and the logarithmic type. Block interval demand indicators integrate the load separately during each interval and are reset at the end of the interval, thus indicating the arithmetic mean during the interval.

Logarithmic demand indicators are in effect wattmeters with a considerable time lag and they integrate with respect to time the difference between the instantaneous power and the indication already attained by the indicator. They provide at any instant an indication of the mean demand for a previous time period, the length of which depends upon the design of the indicator. In this respect, they have the advantage over block interval demand indicators of not missing peak loads which may happen to occur near the end of a time interval and thus be split between two intervals of the block interval indicator. Furthermore, since the limiting factor in the loading of the equipment of the central station company is the heating, which follows a logarithmic law, it is of advantage to employ a demand indicator which follows the same law.

Both thermally-operating and mechanically-operating logarithmic demand indicators are already known. The principle of the thermal wattmeter is employed in the thermal type of logarithmic demand indicator described by Lincoln in Transactions of the American Institute of Electrical Engineers for 1915, Volume XXXIV, pages 2279 to 2318. Mechanically-operating demand indicators avoid discrepancies from a true logarithmic law occurring in thermal demand indicators owing to certain physical limitations of available material and also owing to the effect of radiation in thermal indicators. Logarithmic-law mechanical demand indicators, such as those disclosed in Patent No. 1,331,059 to Hall or in volume 53 of Electrical Engineering for January, 1934, pages 94 to 96, consist of a watt-hour meter shaft rotating at a speed proportional to instantaneous load, a constant-speed shaft, a rotatable member, a variable velocity-ratio friction drive between the constant-speed shaft and the rotatable member, and means responsive to difference in speed between the watt-hour meter shaft and the rotatable member for adjusting the friction drive to bring the speeds of the watt-meter shaft and the rotatable member into conformity.

In accordance with my invention in its preferred form, I likewise provide a primary element or effect responsive to the instantaneous value of a quantity to be measured, a secondary element or effect, and means for bringing the secondary element or effect into conformity with the first at a rate proportional to the difference between them. However, I utilize mechanical connections providing a positive drive in order to prevent slippage. In carrying out my invention in its preferred form, induction motor elements are employed as the primary and secondary elements and an electrical or magnetic arrangement responsive to differential action of the primary and secondary elements is employed to vary the strength of one of the elements in order to bring the action of the two into conformity. Any suitable characteristics, such as speed or torque, may form the basis of comparison of the action of the two elements.

The features of my invention which are believed to be novel and patentable will be pointed out in the claims appended hereto. A better understanding of my invention may be obtained by referring to the following description taken in connection with the accompanying drawing in which Fig. 1 represents a differential torque type demand indicator constructed in accordance with my invention; Fig. 2 represents a different speed type demand indicator constructed in accordance with my invention; and Fig. 3 represents in part a modification of the arrangement of Fig. 2.

For the sake of illustration, I have shown in the drawing and shall describe the manner of applying my invention to the measurement of maximum load demand of an electrical distribution circuit. It will be understood, however, that the principle of my invention may be applied to the indication of mean values of any variable quantity susceptible to being compared with an adjustable comparison quantity and is not limited to the measurement of quantities in electrical distribution circuits. Nor is its use in electrical distribution circuits limited to the measurement of real-power demand as it obviously includes also the measurement of apparent-power demand and reactive-component-of-power demand.

Referring now more in detail to the drawing in which like reference characters are utilized to designate like parts throughout, in the arrangement illustrated in Fig. 1, the apparatus is shown connected to an electric system 11 supplying a load 12. The apparatus includes a load-responsive primary torque-producing unit 13 and, acting in opposition thereto, an adjustable strength secondary torque-producing unit 14 with means for continually adjusting the strength of the unit 14 to correspond to that of the load-responsive unit 13. The load-responsive unit 13 may comprise a mechanism similar to an induction watt-hour meter mechanism having a schematically represented laminated field core 15 and a rotatable disc 16 cooperating with the field. The field core 15 carries a potential winding 17 connected across the source 11, and a current winding 18 connected in series with the load 12.

To energize and control the adjustable torque-producing unit 14, there are provided an auxiliary source of current 19 and a circuit controller 20 through which the current from source 19 is supplied to the windings of the unit 14. The unit 14 may also comprise a mechanism of the induction watt-hour meter type with a laminated field core 21, represented schematically, and with potential and current windings 22 and 23, respectively. However, for the sake of simplicity, I prefer to mount a shading coil 22' on one of the pole pieces of the core 21 and energize the unit only through one of its windings 23 which may be either a current or potential winding, depending upon the voltage of the source 19 and the type of circuit controller 20 employed. The unit 14 also includes an induction disc cooperating with the field core 21. In the arrangement illustrated in Fig. 1, the disc 16 is common to field cores 15 and 21 for the sake of compactness but, if it is desired to eliminate any possibility of interaction between the fields 15 and 21, separate discs may be employed which may be mounted on a common shaft 24 or may be otherwise mechanically connected.

Any suitable arrangement may be employed for adjusting the torque of the secondary unit 14. For example, the adjustment may be made by varying the voltage or current in the winding 23. By way of illustration, I have shown the circuit controller 20 taking the form of a resistance potentiometer with a movable contact 25 serving to vary the voltage applied to the winding 23 according to the position of the contact 25. The movable contact 25 is mechanically connected to the shaft 24 carrying the rotatable disc 16 in such a manner that rotation of the disc 16 moves the contact 25 in the direction required to equalize the torques. Speed reduction gearing 26 is interposed between shaft 24 and the movable contact 25 in order to cause the torque adjustment to take place gradually and to represent the mean value of the load measured by the unit 13 over a preceding time interval.

If the source 19 has a substantially constant voltage or the arrangement is such that the operation of the unit 14 is independent of voltage fluctuations, the position of the contact 25 will represent the load demand. However, if desired, a current-responsive device 27 may be connected in series with the winding 23 to serve as an indication of the adjustment of the unit 14 and, therefore, of the load demand. The current-responsive device 27 may take the form, for example, of an indicating or a curve-drawing ammeter. If desired, it may be provided with both an indicating pointer 28 and a maximum pointer 29. The maximum pointer 29 is arranged to be pushed upscale by the pointer 28 but to retain its attained position by reason of friction or otherwise as in maximum indicating instruments well known in the art.

The principle of operation of the apparatus is apparent from the foregoing description of its elements. The torque of the load-responsive unit 13 will vary with variations in the momentary value of the power drawn by the load 12. The torque of the adjustable torque unit 14 and the indication of the instrument 27 will depend upon the setting of the circuit controller 20, which tends to follow variations in the torque of the unit 13 but the final adjustment cannot take place immediately.

The rate at which the movable contact 25 is moved is proportional to the difference in the action of units 13 and 14. The adjustment, therefore, takes place less and less rapidly as the actions of the two torque-producing units approach equalization and theoretically an infinite period of time would be required for complete equalization, thus producing what is called the "logarithmic characteristic". However, the design of the apparatus definitely determines the time required for the torque of the secondary unit to reach a predetermined fraction, such as nine-tenths of the torque of the primary unit, when the primary torque is sustained at a constant value. Since the rate of adjustment of the secondary is greatest when the deviation between its torque setting and the torque of the primary unit is greatest, load peaks of short duration will have more effect on the apparatus than loads representing the same total energy but of longer duration and lower peak value. The indication attained by the instrument 27 is, therefore, a weighted mean of power drawn by the load 12 during the immediately preceding time.

In Fig. 1, I have shown a pair of torque-producing units or motors for producing torques representing the momentary value and the periodic mean value, respectively, of a measured quantity and arranged to have the torque of one unit brought into conformity with that of the other. However, it will be understood that my invention is not limited to this precise construction but includes any arrangement for comparing or bringing into conformity the action or the outputs of two units responding respectively to the momentary value and the logarithmic mean value of a measured quantity. For example, in the arrangement of Fig. 2 also, I employ torque-producing units or motors 13 and 14 corresponding to those of Fig. 1, but I so arrange the apparatus that the speeds rather than the torques are brought into conformity. The secondary adjustable torque-producing unit 14 is provided with an independent rotatable disc 30 in the arrangement of Fig. 2 and a differential 31 is provided for comparing the speeds of the discs 16 and 30. The differential 31 comprises sun gears 32 and 33 mechanically connected to the discs 16 and 30, respectively, and planet gears 34 carried by a planetary housing 35.

The planetary housing 35 carries the movable contact 25 of the resistance potentiometer 20 and also carries a pointer 36 cooperating with a scale 37. It will be apparent that, if the adjustment of the potentiometer 20 is such that the torque-producing units 13 and 14 rotate the planet gears 32 and 33 at different speeds, the housing 35 will be rotated in one direction or another, causing the movable contact 25 to slide along the potentiometer 20 and bring the speeds of the units 13 and 14 into conformity. The discs 16 and 30 need not necessarily rotate at the same speed when the housing 35 is stationary, since different gear ratios may be employed between the discs and the corresponding sun gears of the differential 31. If the voltage of the source 19 is substantially constant, the speed of the disc 30 will depend on the position attained by the movable contact 25 and the demand may, therefore, be read from the scale 37. If the voltage of the source 19 tends to vary, demand readings are preferably obtained from the ammeter 27.

A modified arrangement for causing the adjustable torque unit 14 to adjust its action in conformity to the speed of the load-responsive unit 13 is illustrated in Fig. 3. In this arrangement, no mechanical differential is employed but the resistance potentiometer 20 is arranged in annular form and is axially mounted upon a shaft 38 mechanically connected through the reduction gearing 26 to the shaft 24 of the load-responsive unit 13. The potentiometer 20 is provided with a movable contact 25' which is carried by a shaft 39 mechanically connected through suitable gearing 40 to a shaft 41 carrying the disc 30 of the adjustable torque unit 14. It will be apparent that, until the shaft 41 has reached a speed corresponding to but not necessarily equaling the speed of the shaft 24, relative motion will take place between the annular potentiometer 20 and the movable contact 25', bringing about a change in the speed of the shaft 41 of the adjustable torque unit 14. The logarithmic mean value of the load to be measured may, therefore, be determined by means of a suitably calibrated instrument 27 as in the embodiments of my invention shown in Figs. 1 and 2.

I have herein shown and particularly described certain embodiments of my invention and certain methods of operation embraced therein for the purpose of explaining its principle and showing its application, but it will be obvious to those skilled in the art that many modifications and variations are possible and I aim, therefore, to cover all such modifications and variations as fall within the scope of my invention which is defined in the appended claims.

What I claim as new and desire to secure by Letters Patent of the United States, is:—

1. A demand indicator comprising in combination, an integrating electric motor, a rotating shaft driven thereby, a second rotating shaft, a motor driving said second shaft, means for supplying current to said motor, means responsive to the difference in speeds of said shafts, and means controlled thereby for varying the current supplied to said motor in such a direction as to equalize the speeds of said shafts.

2. A demand indicator comprising in combination, a mechanism for producing a torque proportional to the momentary value of the quantity the demand for which is to be indicated, a countertorque-producing mechanism, said torque-producing mechanisms having a common rotatable member, said countertorque-producing mechanism having an energizing current-conducting winding, and means for supplying an adjustable current thereto having a movable adjusting member mechanically so connected to said rotatable member as to be moved thereby in a direction required to balance the torques of said torque-producing mechanisms.

3. A demand indicator comprising in combination, a mechanism for producing a torque proportional to the momentary value of a quantity, the demand for which is to be indicated, a countertorque-producing mechanism, said torque-producing mechanisms having a common rotatable member, said countertorque-producing mechanism having an energizing current-conducting winding, means for supplying an adjustable current thereto having a movable adjusting member, a speed reduction gearing mechanically connecting said movable adjusting member and said rotatable member and arranged to move said adjusting member in a direction required to balance the torques of said torque-producing mechanisms.

4. A demand indicator comprising in combination, a pair of torque-producing mechanisms acting in opposition, one of said mechanisms having a torque proportional to the momentary value of the quantity the demand for which is to be indicated and the other of said mechanisms having an adjustable torque, a member acted upon jointly by said torque-producing mechanisms and movable in response to unbalance in their actions, and movable means for adjusting the torque of said latter torque-producing mechanism, so connected to said movable member as to be moved thereby in a direction required to balance the action of said torque-producing mechanisms.

5. A demand indicator comprising in combination a pair of torque-producing mechanisms acting in conjunction, one of said mechanisms having an output proportional to the momentary value of a quantity, the demand for which is to be indicated, and the other of such mechanisms having an adjustable output, an adjustable device acted upon jointly by said torque-producing mechanisms arranged to have its adjustment varied when said mechanisms act thereon unequally, said device being so connected to said adjustable torque-producing mechanisms as to vary the output thereof in the direction required to equalize the action of said torque-producing mechanisms.

6. A demand indicator comprising in combination, a pair of torque-producing mechanisms acting in conjunction, one of said mechanisms having an output proportional to the momentary value of a quantity, the demand for which is to be indicated, and the other of said torque-producing mechanisms having an energizing current-conducting winding, a circuit controller acted upon jointly by said torque-producing mechanisms, a source of current connected to the energizing winding of said latter torque-producing mechanism and controlled by said circuit controller, said circuit controller being arranged to be so acted upon by the joint action of said torque-producing mechanisms as to vary the current in said energizing winding in the direction required to equalize the action of said torque-producing mechanisms.

7. A demand indicator comprising in combination, a pair of torque-producing mechanisms acting in conjunction, one of said mechanisms having an output proportional to the momentary value of a quantity, the demand for which is to be indicated, and the other of said mechanisms having an energizing current-conducting winding, means for supplying an adjustable current to said winding acted upon jointly by said torque-producing mechanisms, the arrangement being such that the current magnitude is varied in response to unequal action of said torque-producing mechanisms in a direction required to equalize said action, and a current-responsive device connected in series with said winding and said adjustable current source.

8. A demand indicator comprising in combination, a pair of motors acting in conjunction, one of said motors having a speed proportional to the momentary value of the quantity the demand for which is to be indicated, the other of said motors having an adjustable speed, shafts driven by said motors, means responsive to the difference in speeds of said shafts, and means controlled thereby for varying the speed of the adjustable speed motor in such a direction as to equalize the speeds of said shafts.

9. A demand meter comprising in combination, a motor rotating at a speed proportional to the momentary value of the quantity the demand for which is to be indicated, an adjustable speed motor, movable means for controlling the speed of said adjustable speed motor, a differential mechanism having rotatable elements mechanically connected to said motors, and an element movable in response to the difference in speeds of said rotating elements, said movable element being so connected to the speed controller of said adjustable speed motor as to equalize the speeds of the rotating elements of said differential mechanism.

10. A demand indicator comprising in combination, a motor having a speed proportional to the momentary value of the quantity the demand for which is to be indicated, an adjustable speed motor, a source of current energizing said adjustable speed motor, and a circuit controller interposed between said current source and said motor to vary the speed thereof, said circuit controller having a pair of relatively movable elements to vary the adjustment thereof, one of said elements being mechanically connected to one of said motors and the other being connected to the other of said motors, the arrangement being such that differences between absolute speeds of the elements of said circuit controller vary the adjustment thereof to bring the speed of the adjustable speed motor into conformity with that of the other motor.

11. A demand indicator comprising in combination, a unit acting with a force proportional to the momentary value of the quantity the demand for which is to be indicated, a second unit acting with a force proportional to the logarithmic mean during the preceding time of the force of said first unit, and means producing an indication varying as the force of said second unit varies.

12. A device for indicating the ligarithmic means for the preceding time of the action of a movable member comprising in combination with said movable member, a second movable member, means for bringing the action of said second member into conformity with that of the first member at a rate continuously proportional to the difference in their action, and means responsive to the action of said second member.

HERBERT DALLMANN.

---

DISCLAIMER 2,020,997.—*Herbert Dallmann*, Berlin-Karlshorst, Germany. DEMAND INDICATOR. Patent dated November 12, 1935. Disclaimer filed March 31, 1937, by the assignee, *General Electric Company*.

Hereby enters this disclaimer to claims 4 and 5 of said Letters Patent.

[*Official Gazette April 27, 1937.*]

the output thereof in the direction required to equalize the action of said torque-producing mechanisms.

6. A demand indicator comprising in combination, a pair of torque-producing mechanisms acting in conjunction, one of said mechanisms having an output proportional to the momentary value of a quantity, the demand for which is to be indicated, and the other of said torque-producing mechanisms having an energizing current-conducting winding, a circuit controller acted upon jointly by said torque-producing mechanisms, a source of current connected to the energizing winding of said latter torque-producing mechanism and controlled by said circuit controller, said circuit controller being arranged to be so acted upon by the joint action of said torque-producing mechanisms as to vary the current in said energizing winding in the direction required to equalize the action of said torque-producing mechanisms.

7. A demand indicator comprising in combination, a pair of torque-producing mechanisms acting in conjunction, one of said mechanisms having an output proportional to the momentary value of a quantity, the demand for which is to be indicated, and the other of said mechanisms having an energizing current-conducting winding, means for supplying an adjustable current to said winding acted upon jointly by said torque-producing mechanisms, the arrangement being such that the current magnitude is varied in response to unequal action of said torque-producing mechanisms in a direction required to equalize said action, and a current-responsive device connected in series with said winding and said adjustable current source.

8. A demand indicator comprising in combination, a pair of motors acting in conjunction, one of said motors having a speed proportional to the momentary value of the quantity the demand for which is to be indicated, the other of said motors having an adjustable speed, shafts driven by said motors, means responsive to the difference in speeds of said shafts, and means controlled thereby for varying the speed of the adjustable speed motor in such a direction as to equalize the speeds of said shafts.

9. A demand meter comprising in combination, a motor rotating at a speed proportional to the momentary value of the quantity the demand for which is to be indicated, an adjustable speed motor, movable means for controlling the speed of said adjustable speed motor, a differential mechanism having rotatable elements mechanically connected to said motors, and an element movable in response to the difference in speeds of said rotating elements, said movable element being so connected to the speed controller of said adjustable speed motor as to equalize the speeds of the rotating elements of said differential mechanism.

10. A demand indicator comprising in combination, a motor having a speed proportional to the momentary value of the quantity the demand for which is to be indicated, an adjustable speed motor, a source of current energizing said adjustable speed motor, and a circuit controller interposed between said current source and said motor to vary the speed thereof, said circuit controller having a pair of relatively movable elements to vary the adjustment thereof, one of said elements being mechanically connected to one of said motors and the other being connected to the other of said motors, the arrangement being such that differences between absolute speeds of the elements of said circuit controller vary the adjustment thereof to bring the speed of the adjustable speed motor into conformity with that of the other motor.

11. A demand indicator comprising in combination, a unit acting with a force proportional to the momentary value of the quantity the demand for which is to be indicated, a second unit acting with a force proportional to the logarithmic mean during the preceding time of the force of said first unit, and means producing an indication varying as the force of said second unit varies.

12. A device for indicating the ligarithmic means for the preceding time of the action of a movable member comprising in combination with said movable member, a second movable member, means for bringing the action of said second member into conformity with that of the first member at a rate continuously proportional to the difference in their action, and means responsive to the action of said second member.

HERBERT DALLMANN.

DISCLAIMER 2,020,997.—*Herbert Dallmann,* Berlin-Karlshorst, Germany. DEMAND INDICATOR. Patent dated November 12, 1935. Disclaimer filed March 31, 1937, by the assignee, *General Electric Company.*

Hereby enters this disclaimer to claims 4 and 5 of said Letters Patent.

[*Official Gazette April 27, 1937.*]